United States Patent
Ahn et al.

(10) Patent No.: US 11,440,469 B2
(45) Date of Patent: Sep. 13, 2022

(54) COMMUNICATION LIGHTING SYSTEM FOR VEHICLE

(71) Applicants: Hyundai Motor Company, Seoul (KR); Kia Motors Corporation, Seoul (KR)

(72) Inventors: Byoung Suk Ahn, Gwacheon-Si (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 17/032,495

(22) Filed: Sep. 25, 2020

(65) Prior Publication Data

US 2021/0347295 A1 Nov. 11, 2021

(30) Foreign Application Priority Data

May 8, 2020 (KR) .......................... 10-2020-0054985

(51) Int. Cl.
*G08G 1/16* (2006.01)
*B60Q 1/08* (2006.01)
*B60Q 1/50* (2006.01)

(52) U.S. Cl.
CPC ............. *B60Q 1/525* (2013.01); *B60Q 1/085* (2013.01); *G08G 1/164* (2013.01); *G08G 1/166* (2013.01); *B60Q 2300/45* (2013.01)

(58) Field of Classification Search
None
See application file for complete search history.

(56) References Cited

U.S. PATENT DOCUMENTS

| | | | | |
|---|---|---|---|---|
| 9,024,740 | B2* | 5/2015 | Min | B60Q 1/18 340/901 |
| 9,108,568 | B2* | 8/2015 | Takahira | F21S 41/16 |
| 9,771,021 | B1* | 9/2017 | Lindsay | B60Q 1/085 |
| 9,902,308 | B2* | 2/2018 | Yagi | B60Q 1/16 |
| 10,134,280 | B1* | 11/2018 | You | B60Q 1/525 |
| 10,688,913 | B2* | 6/2020 | Hiroi | B60Q 1/143 |
| 10,706,719 | B2* | 7/2020 | Zhang | G03B 29/00 |
| 10,981,497 | B2* | 4/2021 | Lee | B60Q 1/507 |
| 11,074,810 | B2* | 7/2021 | Wang | B60Q 1/50 |
| 11,178,738 | B2* | 11/2021 | Kimura | H05B 45/20 |
| 2004/0183906 | A1* | 9/2004 | Nagaoka | G06V 40/103 348/148 |

(Continued)

FOREIGN PATENT DOCUMENTS

| | | |
|---|---|---|
| DE | 102011119230 A1 | 5/2013 |
| JP | 2006-044359 A | 2/2006 |

(Continued)

*Primary Examiner* — Muhammad Adnan
(74) *Attorney, Agent, or Firm* — Morgan, Lewis & Bockius LLP

(57) ABSTRACT

A pedestrian around a vehicle is detected and communication is performed between the pedestrian and the vehicle via lighting which is sequentially lit, whereby the vehicle and the pedestrian recognize each other and thus safety is secured. That is, provided is a communication lighting system for a vehicle in which the vehicle transmits a signal that the vehicle has recognized the pedestrian by projecting light following the movement path of the pedestrian, and the pedestrian identifies that the vehicle has recognized the pedestrian.

19 Claims, 11 Drawing Sheets

(56) References Cited

U.S. PATENT DOCUMENTS

| | | | | |
|---|---|---|---|---|
| 2008/0175012 A1* | 7/2008 | Shimaoka | B60Q 9/008 362/464 |
| 2011/0068910 A1* | 3/2011 | Iwai | F21S 41/663 340/435 |
| 2012/0191298 A1* | 7/2012 | Schwarzhaupt | G08G 1/167 701/36 |
| 2014/0062685 A1* | 3/2014 | Tamatsu | G08G 1/005 340/425.5 |
| 2014/0368668 A1* | 12/2014 | Sasabuchi | G01S 13/931 348/187 |
| 2015/0258928 A1* | 9/2015 | Goto | B60Q 1/525 701/49 |
| 2015/0348416 A1* | 12/2015 | Fujita | G08G 1/16 348/47 |
| 2015/0375672 A1* | 12/2015 | Takahashi | F21S 41/25 362/510 |
| 2016/0121791 A1* | 5/2016 | Shimizu | G08G 1/166 340/435 |
| 2017/0050556 A1* | 2/2017 | Nakashima | B60Q 1/085 |
| 2017/0144584 A1* | 5/2017 | Asaoka | B60R 11/04 |
| 2017/0259728 A1* | 9/2017 | Nagata | B60Q 1/46 |
| 2018/0118106 A1* | 5/2018 | You | G06V 40/103 |
| 2018/0297511 A1* | 10/2018 | Park | B60Q 1/1423 |
| 2019/0012537 A1* | 1/2019 | Heimberger | G06T 7/73 |
| 2019/0135169 A1* | 5/2019 | Conger | B60Q 1/488 |
| 2019/0197882 A1* | 6/2019 | Camras | B60Q 1/525 |
| 2019/0236939 A1* | 8/2019 | Zhang | G06V 20/54 |
| 2019/0308502 A1* | 10/2019 | Yoneyama | G09G 3/002 |

FOREIGN PATENT DOCUMENTS

| | | |
|---|---|---|
| JP | 2008-226140 A | 9/2008 |
| KR | 10-2013-0090542 | 8/2013 |
| KR | 10-2016-0010964 A | 1/2016 |
| KR | 10-2016-0097583 | 8/2016 |
| KR | 10-2017-0080783 A | 7/2017 |
| KR | 2018-0132584 A | 12/2018 |

* cited by examiner

COMMUNICATION LIGHTING SYSTEM FOR VEHICLE

CROSS REFERENCE TO RELATED APPLICATION

The present application claims priority to Korean Patent Application No. 10-2020-0054985, filed on May 8, 2020, the entire contents of which is incorporated herein for all purposes by this reference.

BACKGROUND OF THE INVENTION

Field of the Invention

The present invention relates to a communication lighting system for a vehicle that provides information to a pedestrian using the lighting device of the vehicle.

Description of Related Art

Lighting devices utilizing various light sources are applied to vehicles, and each lighting device is appropriately used according to the characteristics thereof, as well as the installation location and use purpose.

The lighting devices include, for example, an indoor lighting lamp, which is disposed inside the vehicle, and a headlight, a fog lamp, a tail lamp, a side marker lamp, a license plate lamp, a brake lamp, a turn indicator lamp, and an emergency flashing indicator lamp, which are disposed outside the vehicles.

Lighting disposed outside the vehicle also contributes to the appearance of the product, so that the lighting design and lighting effect of vehicles are also important.

In general, lighting disposed in the vehicles has the primary purpose of radiating light toward the front side, so that the development of technology has emphasized securing light convergence and diffusivity. Furthermore, to improve the design of lighting, the shape of the periphery of the lighting is changed to improve aesthetics, and sequentially lit lighting is often applied.

Meanwhile, autonomous vehicles have been developed recently, and autonomous vehicles require communication with external pedestrians for safety. However, when a separate device is provided for communication with an external pedestrian, there is a problem that the installation space for the device is restricted.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a communication lighting system for a vehicle (which may also be referred to as a "vehicle communication lighting system" below) that ensures stability through communication with an external pedestrian using sequentially lit lighting.

To achieve the purpose, a communication lighting system according to various exemplary embodiments of the present invention includes: a lighting unit including a plurality of light sources disposed in sequence to divide a light irradiation area into a plurality of areas and to project light to each of the areas with different brightness; a sensor unit configured to detect an object with respect to a detection area around the vehicle to detect the position of the object; and a control unit configured to control the lighting unit, receive information from the sensor unit, set a priority of an object entering the detection area, and selectively control the brightness of the light to be projected to the object with different brightness by selectively controlling each of the light sources of the lighting unit according to the priority of the object moving in the detection area.

When a plurality of objects enter the detection area, the control unit sequentially sets each object as an n-th detection object, and the control unit controls the lighting unit to perform brightness control of light for a first detection object, performs the brightness control of light for the n-th object entering the detection area after the first detection object leaves the detection area, and then performs the brightness control of light for an n'-th detection object entering the detection area after the n-th detection object leaves the detection area, whereby the brightness control of light is sequentially performed.

When the controller identifies that an object has entered the detection area via the sensor unit, the control unit sets the object that has first entered the detection area as a first detection object, and performs the brightness control of light for the first detection object by controlling the lighting unit.

When the controller identifies that another object has entered the detection area subsequent to the first detection object, the control unit sets the another object as a second detection object, and when the first detection object is located within the detection area, the control unit does not perform the brightness control of light for the second detection object.

When the first detection object leaves the detection area in the state in which the first detection object and the second detection object are located in the detection area, the control unit performs the brightness control of light for the second detection object.

When the controller identifies that yet another object has entered the detection area subsequent to the second detection object, the control unit sets the yet another object as a third detection object, and when the third detection object enters the detection area after the first detection object left the detection area, the control unit performs the brightness control of light for the third detection object.

Lighting units are provided to be spaced from each other in a width direction of the vehicle, including a left lighting unit having a left irradiation area and a right lighting unit having a right irradiation area in the width direction of the vehicle, and the sensor unit detects the position of an object by dividing the detection area into a plurality of sub-areas that include the left irradiation area and the right irradiation area, respectively.

The detection area of the sensor unit includes a first area including the left irradiation area, a second area including the right irradiation area, and a third area including a space between the first area and the second area.

When the controller identifies that two or more objects have entered the first area, the control unit sets the object that first entered the first area as a first detection object, sets the object that subsequently entered the first area as a second detection object, and controls the left lighting unit such that the brightness control of light is performed following the first detection object in the left irradiation area.

When the controller identifies that the first detection object leaves the first area and enters the third area, the control unit controls each lighting unit such that brightness control of light is performed on the right side of the left irradiation area and on the left side of the right irradiation area.

When the controller identifies that the first detection object leaves the third area and enters the second area, the control unit controls the right lighting unit such that the brightness control of light is performed following movement of the first detection object.

The control unit prevents the brightness control of light from being performed on other detection objects entering the detection area in the state in which the first detection object is located in the detection area.

When the third detection object enters the detection area after the first detection object leaves the second area, the control unit performs brightness control of light for the third detection object.

When the first detection object leaves the second detection area, the control unit performs the brightness control of light for the second detection object that enters the detection area subsequent to the first detection object.

When the first detection object has left the first area and the second detection object is located in the first area, the control unit controls the left lighting unit such that brightness control of light is further performed following the movement of the second detection object.

When the second detection object is located in the third area, the control unit controls each lighting unit such that the brightness control of light is further performed on the right side of the left irradiation area and on the left side of the right irradiation area.

When the controller identifies that objects have entered the first area and the second area, respectively, the control unit sets the object that first entered the first area and the second area as a first detection object, sets the object that subsequently entered the first area and the second area as a second detection object, and controls the brightness of light for the first detection object.

The control unit performs the brightness control of light for remaining detection objects other than the first detection object and an additional detection object.

The control unit sets a priority for each of objects that enters the first area, the second area, and the third area, respectively, selects a first detection object in each area, and performs the brightness control of light for each first detection object by controlling the lighting unit.

The control unit prevents the brightness control of light from being performed on other detection objects entering the detection area in the state in which the first detection object is located in the detection area.

When a specific detection object enters the first area or the second area after the first detection object has left the first area or the second area, the control unit performs the brightness control of light for the specific detection object.

The detection area of the sensor unit further includes a fourth area in which the approach of an object on the left side of the first area is detected and a fifth area in which the approach of an object on the right side of the second area is detected.

The vehicle communication lighting system having the structure described above detects a pedestrian around the vehicle and communicates with the pedestrian via lighting which is sequentially lit, ensuring the safety of the vehicle and pedestrian. That is, the vehicle projects light along a movement path of a pedestrian, transmitting a signal that the vehicle has recognized the pedestrian, and the pedestrian is configured to safely move around the vehicle by identifying that the vehicle has recognized the pedestrian.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
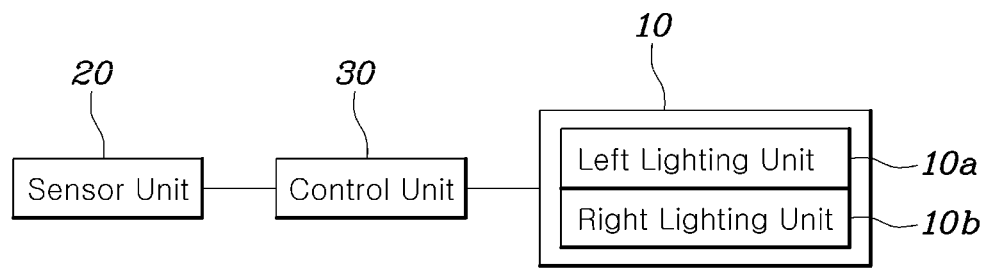
FIG. 1 is a block diagram of a vehicle communication lighting system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a vehicle communication lighting system according to various exemplary embodiments of the present invention will be described with reference to the accompanying drawings.

Figure 2:
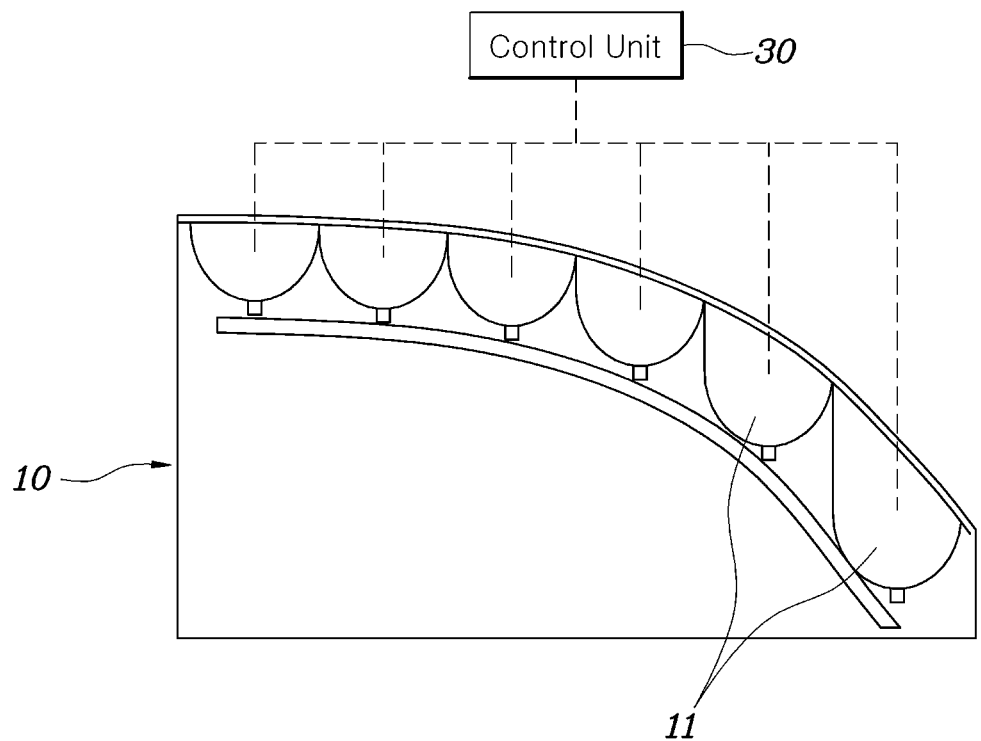
FIG. 2 is a view exemplarily illustrating a lighting unit of the vehicle communication lighting system illustrated in FIG. 1.
Figure 3:
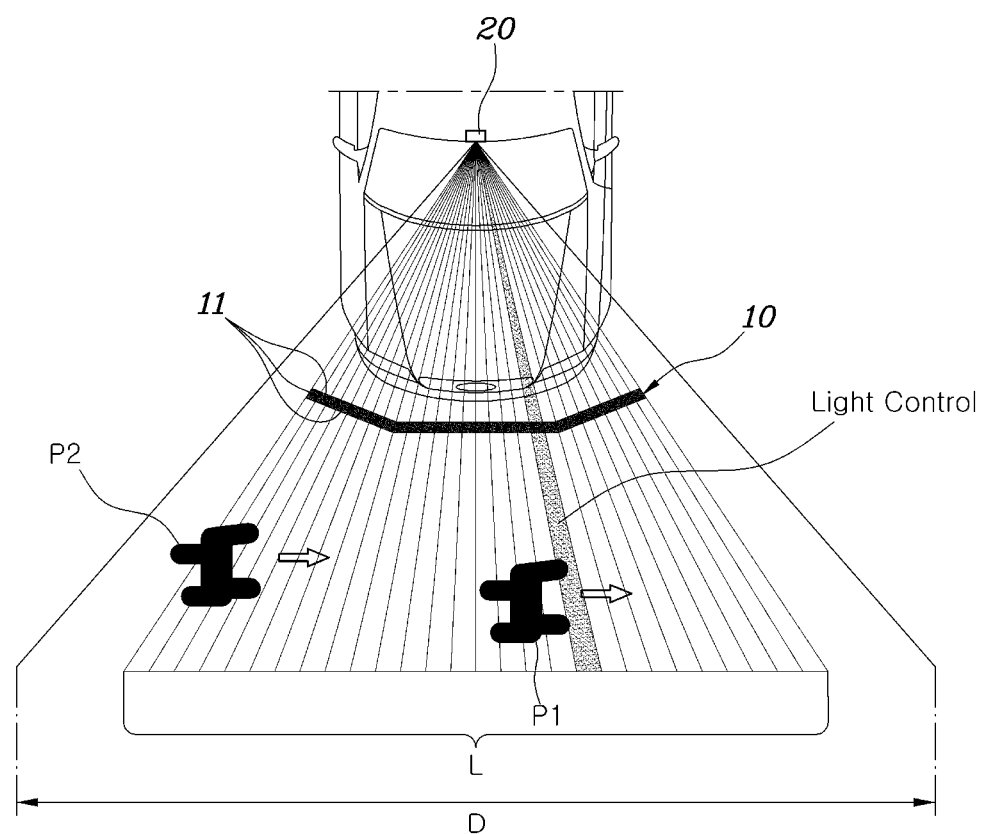
FIG. 3 and FIG. 4 are views, each illustrating an exemplary embodiment of the vehicle communication lighting system according to various exemplary embodiments of the present invention.
Figure 4:
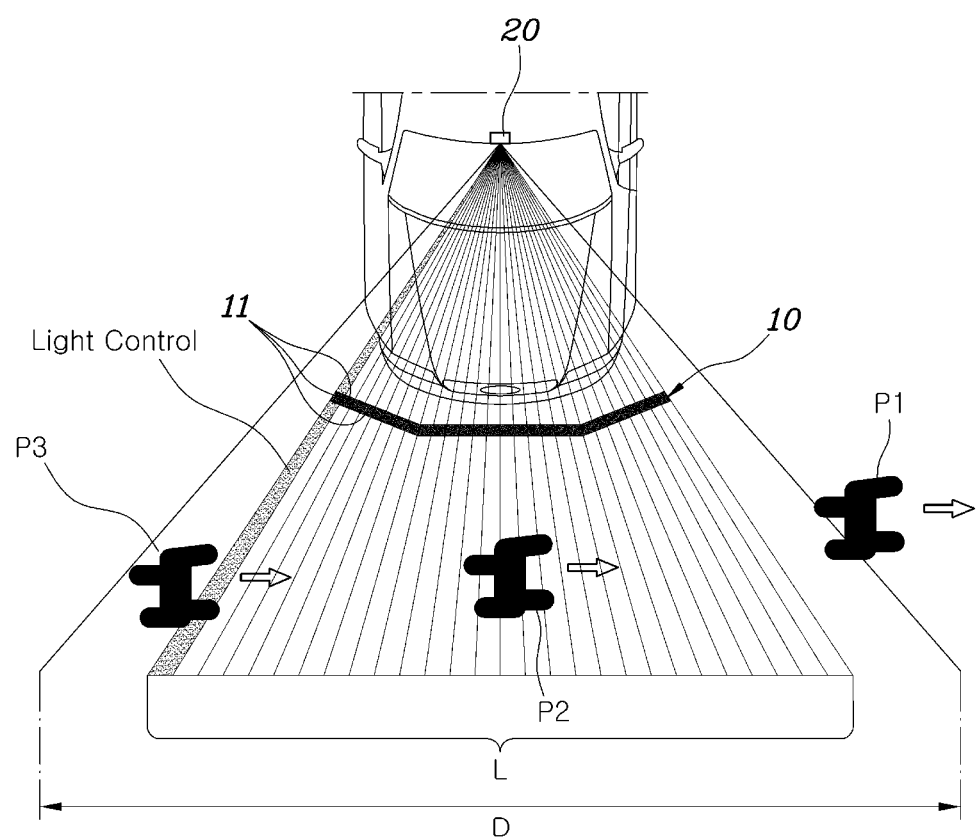
Figure 7:
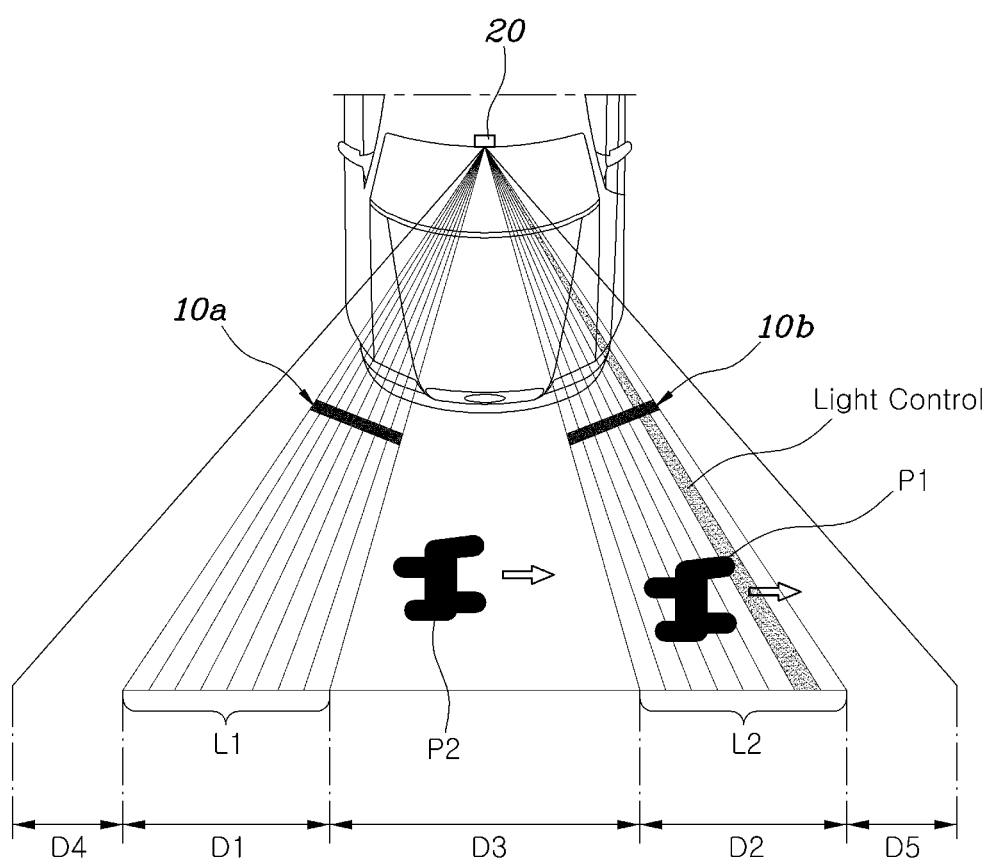
Figure 8:
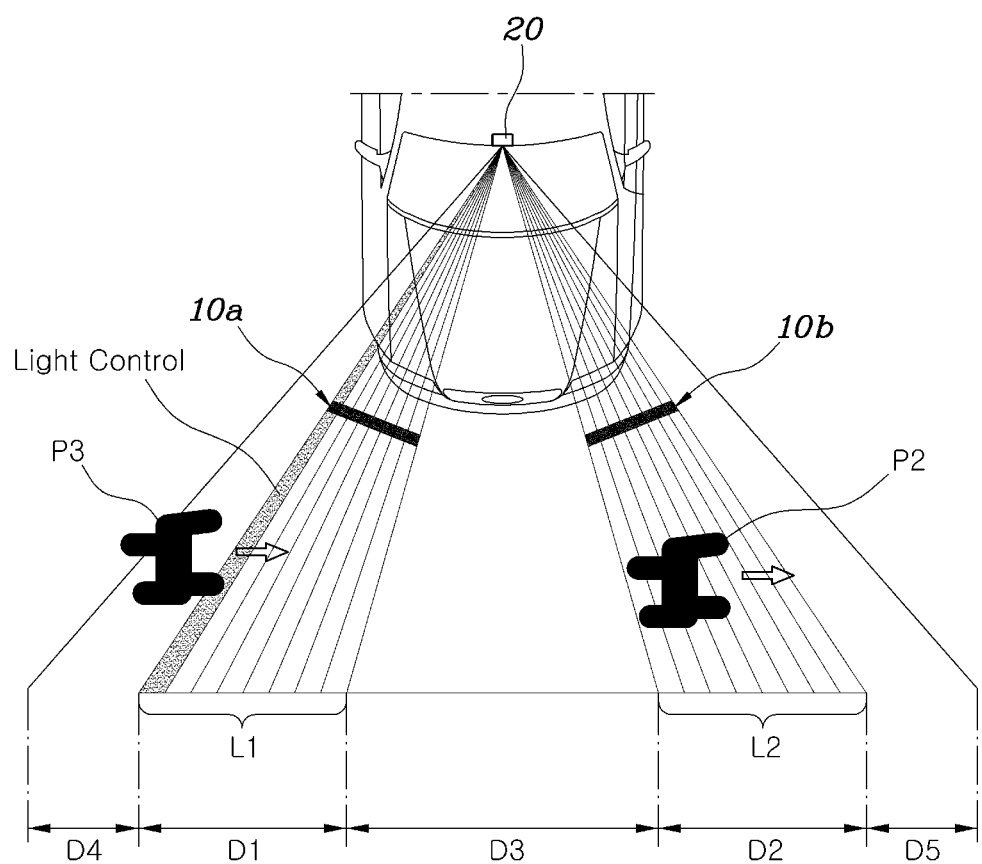
Figure 9:
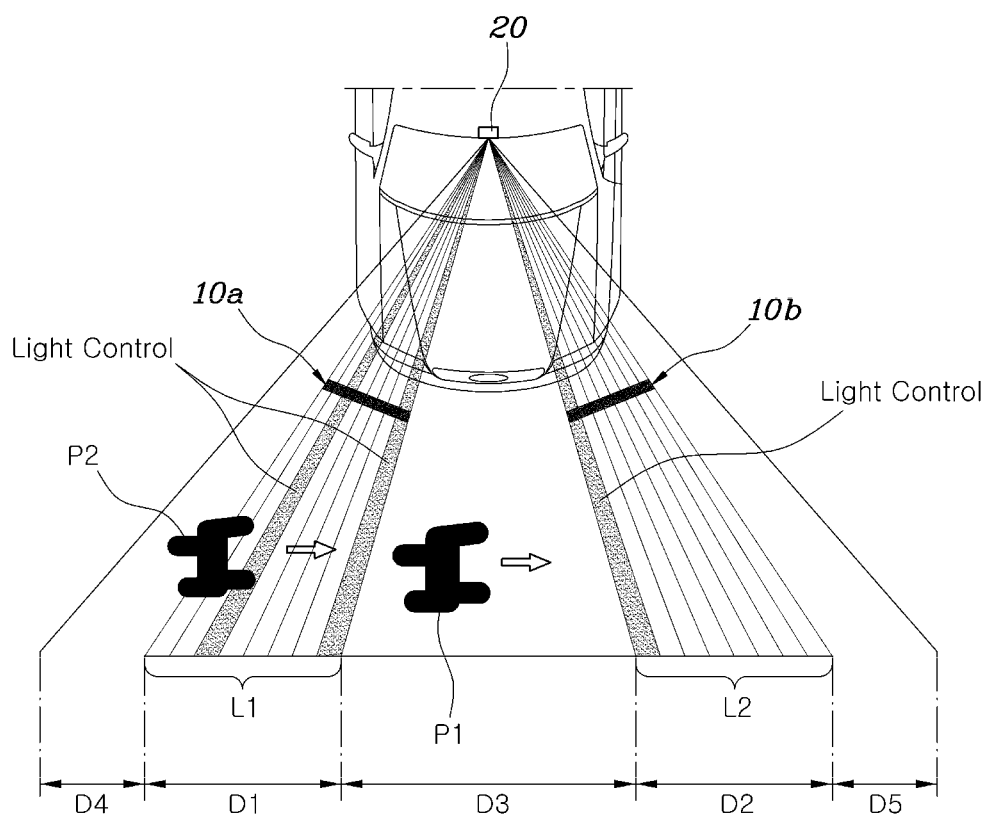
FIG. 9 and FIG. 10 are views, each illustrating another exemplary embodiment of the vehicle communication lighting system according to various exemplary embodiments of the present invention.
Figure 10:
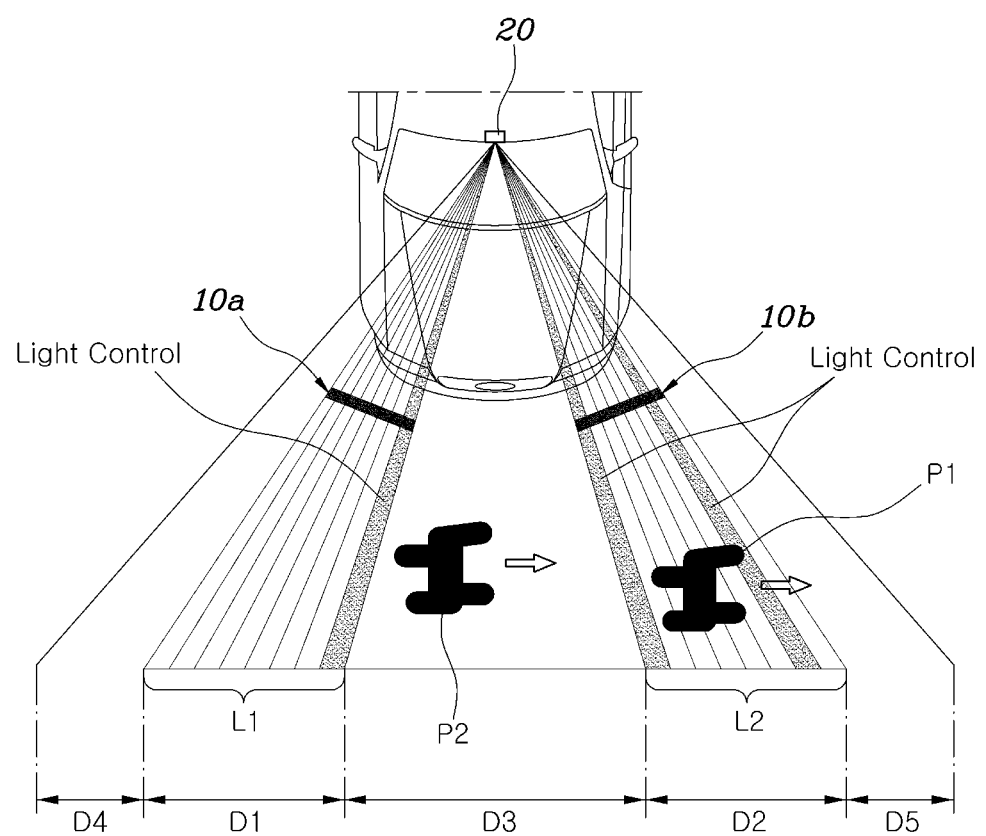
Figure 11:
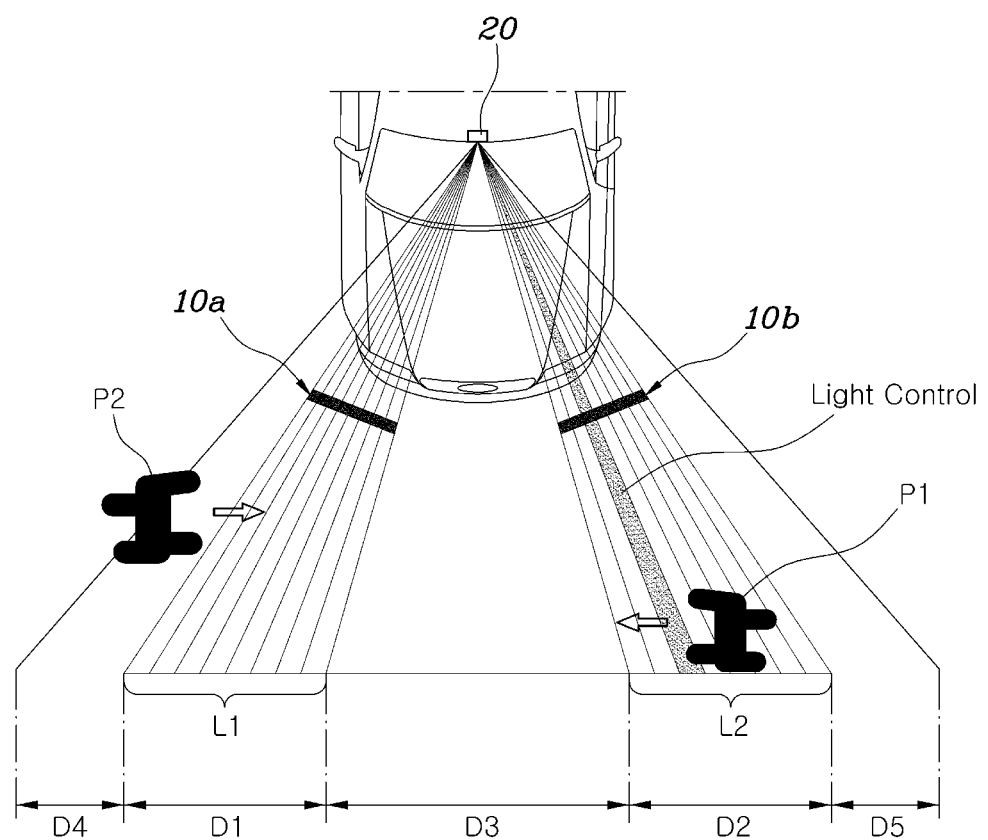
FIG. 11 and FIG. 12 are views, each illustrating another exemplary embodiment of the vehicle communication lighting system according to various exemplary embodiments of the present invention.
Figure 12:
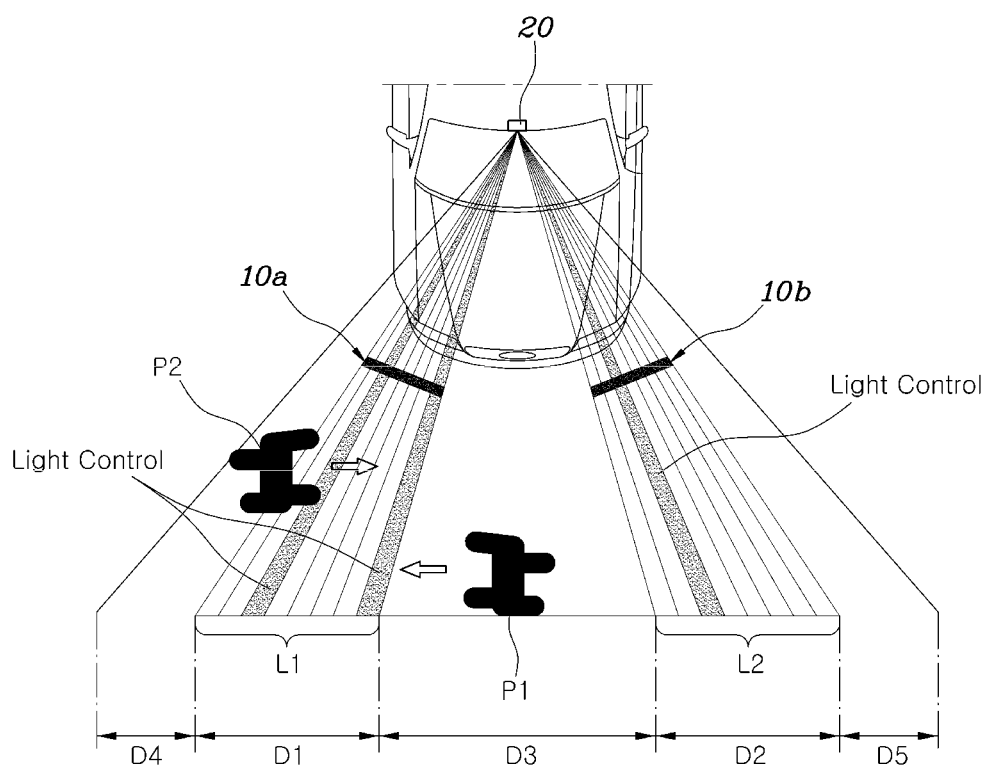

FIG. 1 is a block diagram of a vehicle communication lighting system according to various exemplary embodiments of the present invention, FIG. 2 is a view exemplarily illustrating a lighting unit of the vehicle communication lighting system illustrated in FIG. 1, FIG. 3 and FIG. 4 are views, each illustrating an exemplary embodiment of the vehicle communication lighting system according to various exemplary embodiments of the present invention, FIG. 5, FIG. 6, FIG. 7 and FIG. 8 are views, each illustrating another exemplary embodiment of the vehicle communication lighting system according to various exemplary embodiments of the present invention, FIG. 9 and FIG. 10 are views, each illustrating another exemplary embodiment of the vehicle communication lighting system according to various exemplary embodiments of the present invention, and FIG. 11 and FIG. 12 are views, each illustrating another exemplary embodiment of the vehicle communication lighting system according to various exemplary embodiments of the present invention.

As illustrated in FIG. 1, a vehicle communication lighting system according to various exemplary embodiments of the present invention includes: a lighting unit 10 including a plurality of light sources 11 disposed in sequence to divide a light irradiation area into a plurality of areas and to project light to each of the areas with different brightness; a sensor unit 20 configured to detect an object with respect to a detection area D around the vehicle to detect the position of the object; and a control unit 30 configured to control the lighting unit, receive information from the sensor unit 20, set a priority of an object entering the detection area D, and selectively control the brightness of light to be projected to the object with different brightness by selectively controlling each of the light sources 11 of the lighting unit according to the priority of the object moving in the detection area D.

In various exemplary embodiments of the present invention, various types of objects such as pedestrians or small vehicles may be detected around the vehicle.

As illustrated in FIG. 2, the lighting unit 10 includes a plurality of light sources 11 disposed in a predetermined direction thereof, and each light source 11 is made to be configured for being individually lit by the control unit 30. Accordingly, the illumination area to which light is projected by the lighting unit 10 may be divided into a plurality of areas such that the areas are configured for projecting light with different brightnesses, respectively. The lighting unit 10 may be disposed on the headlamp side of the vehicle, on the rear-lamp side of the vehicle, or on the side-mirror or side-panel sides of the vehicle.

The sensor unit 20 may include various sensors such as LiDAR, radar, and an ultrasonic wave sensor, and sets a detection area D around the vehicle to detect the position of an object detected in the detection area D.

The position information related to the object detected through the sensor unit 20 is transmitted to the control unit 30, and the control unit 30 sets the priority of the object entering the detection area (D) and controls each of the light sources 11 of the lighting unit 10. The control unit 30 sets the priority of the object entering the detection area D, and selectively controls each light source 11 of the lighting unit 10 according to the priority of the object moving in the detection area D such that the light is projected toward the moving object. Here, the controller 30 performs brightness control such that light is projected to the object side with different brightness, and may increase the brightness of the light projected to the object side to ensure that the light is recognized.

That is, when a pedestrian or the object enters the detection area D, the control unit 30 determines the priority according to the order of entry of the pedestrian or the object, and the light of the lighting unit 10 is projected along the moving path of the pedestrian or the object according to the priority, whereby psychological stability of the pedestrian is secured by communication between the vehicle and the pedestrian.

When a plurality of objects enter the detection area D, the control unit 30 sequentially sets each object as an n-th detection object, wherein the n is an integer, and the control unit 30 is configured to: control the lighting unit 10 to perform brightness control of light for the first detection object P; perform the brightness control of light for an n-th object after the first detection object P leaves the detection area D; and then perform the brightness control of light for an n'-th detection object P entering the detection area D after the n-th detection object P leaves the detection area D, whereby the brightness control of light is sequentially performed.

That is, the control unit 30 sets the priority of each of detection objects P according to the entry order of the objects entering the detection area D, and causes the brightness control of light to be sequentially performed for each of the detection object P based on the priority. The present invention designates an object entering the detection area D as a detection object P according to a priority, as described above, and brightness control of light is performed for the detection object P according to the priority, whereby it is possible to externally indicate that the vehicle is recognizing the object passing through the detection area D. Furthermore, the vehicle performs sequential recognition up to the last object in the priority sequence that finally passes the vicinity of the vehicle, preventing a safety accident between the object and the vehicle.

Referring to FIG. 3, when it is determined that an object enters the detection area D via the sensor unit 20, the control unit 30 set the object that first enters the detection area D as a first detection object P1, and controls the lighting unit 10 to perform brightness control of light for the first detection object P1.

That is, the control unit 30 sets the object that first enters the detection area D as the first detection object P1 having the highest priority, and performs brightness control of light such that light is projected to the first detection object P1 moving in the detection area D with different brightness. Here, the brightness control of light increases the brightness of light for the first detection object P1 to cause the light to be concentrated on the first detection object P1, making recognition of the object and communication with the object clear. In the present way, the lighting unit 10 performs the lighting of each light source 11 following the movement path of the first detection object P1, whereby the first detection object P1 is clearly recognized by continuously receiving light while moving.

Meanwhile, when it is identified that another object enters the detection area D after the first detection object P1, the controller 30 sets the object as a second detection object P2. That is, since a plurality of objects may enter the detection area D, the objects are set as a first detection object, a second detection object, an n-th detection object according to the order in which the objects enter the detection area D.

In the present situation, the control unit 30 may perform control according to various embodiments as follows.

As various exemplary embodiments of the present invention, when the first detection object P1 is located in the detection area D, the control unit 30 does not perform light brightness control for the second detection object P2. That is, even if the second detection object P2 is identified subsequent to the first detection object P1, when the first detection object P1 is located within the detection area D, the control unit 30 may not perform brightness control of light for the second detection object P2, preventing discomfort from being caused by light due to the control of the plurality of light sources 11. Furthermore, since the communication between the vehicle and the object is possible even if brightness control of light is performed only for the first detection object P1, the brightness control of light is performed for the first detection object P1.

Here, when the first detection object P1 leaves the detection area D in the state in which the first detection object P1 and the second detection object P2 are located in the detection zone D, the control unit 30 may perform brightness control of light for the second detection object P2. That is, when the first detection object P1 leaves the detection area D, the brightness control of light performed via the lighting unit 10 is not performed in the detection area D, and thus the second detection object P2 cannot be recognized. Accordingly, when the first detection object P1 leaves the detection area D, the brightness control of light is performed for the second detection object P2 to allow the vehicle to clearly recognize that the second detection object P2 is present in the vicinity thereof and to allow the second detection object P2 to identify that the vehicle also recognizes the second detection object P2.

Meanwhile, as illustrated in FIG. 4, when a third detection object P3 enters the detection area D after the first detection object P1 leaves the detection area D, the control unit 30 may perform brightness control of light for the third detection object P3.

Here, the third detection object P3 is an object that enters the detection area D after the first detection object P1 leaves the detection area D, and is only expressed as the third detection object P3 to help understand the present invention. The third detection object P3 means a detection object P that enters the detection area D after the first detection object P1 leaves the detection area.

When the first detection object P1, to which light is currently projected with different brightness through the lighting unit 10, leaves the detection area D, the brightness control of light is performed for the third detection object P3 that enters the detection area D after the first detection object P1 leaves the first detection area D' such that the light control performed by the lighting unit 10 is maintained. In the instant case, when the first detection object P1 is located in the detection area D, the brightness control of light may not be performed for the second detection object P2 located in the detection area D together with the first detection object P1, and the brightness control of light may be performed only for the third detection object P3, which enters the detection area D after the first detection object P1 leaves the detection area D.

As described above, according to various exemplary embodiments of the present invention, an object entering a detection area D around the vehicle is set as a detection object with a priority, and the lighting unit 10 projects light to the detection object P according to the priority so that communication may be performed such that the vehicle recognizes the object and the object recognizes the vehicle.

In the following, a description will be made assuming that the lighting unit 10 is disposed on the headlamp side of the vehicle. This is only an example to help understanding of the present invention. Without being limited thereto, the lighting unit may be disposed at various positions of the vehicle.

Figure 5:
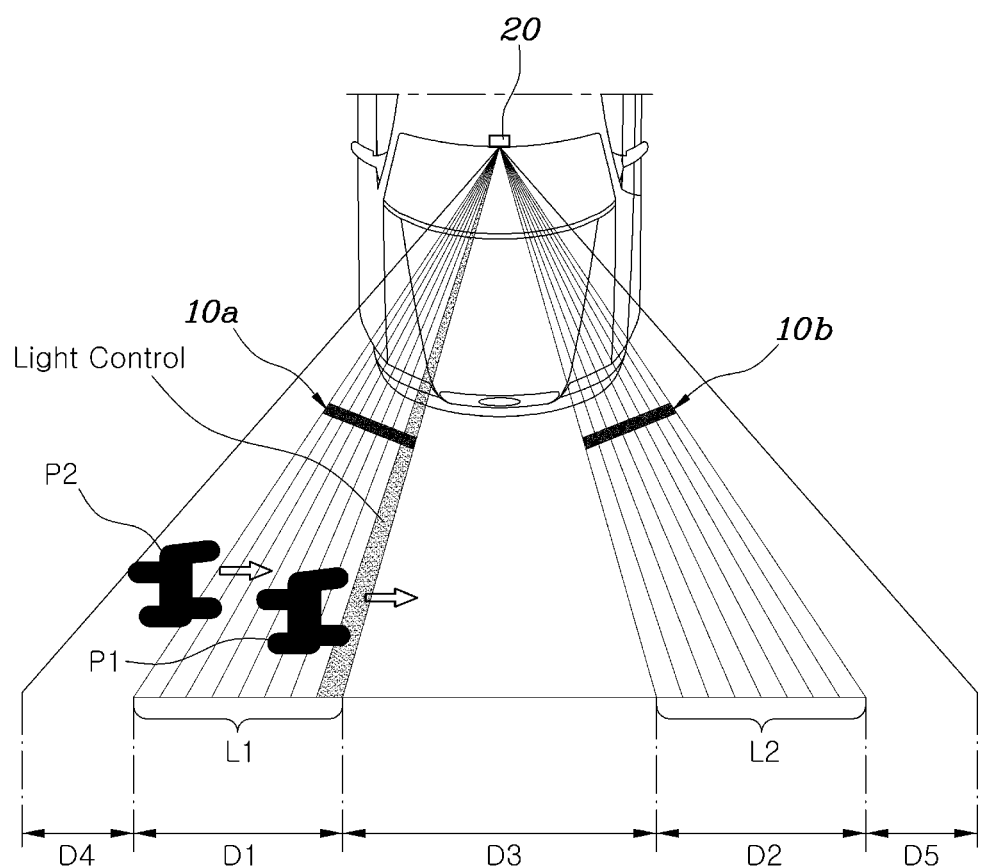
FIG. 5, FIG. 6, FIG. 7 and FIG. 8 are views, each illustrating another exemplary embodiment of the vehicle communication lighting system according to various exemplary embodiments of the present invention.

As illustrated in FIG. 5, lighting units 10 may be provided to be spaced from each other in left and right directions. Thus, the lighting units 10 may include a left lighting unit 10a having a left irradiation area L1 and a right lighting unit 10b having a right irradiation area L2, and the sensor unit 20 may detect the position of an object by dividing the detection area D into a plurality of sub-areas that include the left irradiation area L1 and the right irradiation area L2, respectively.

That is, the lighting units 10 include a left lighting unit 10a and a right lighting unit 10b in the headlamps of the front of the vehicle, and the left lighting unit 10a and the right lighting unit 10b have the left irradiation area L1 and the right irradiation area L2, respectively. The left and right irradiation areas L1 and L2 have the same area. Accordingly, the brightness of light in the left irradiation area L1 may be adjusted differently within an irradiation area L by lightening respective light sources 11 of the left lighting unit 10a, and the brightness of light in the right irradiation area L2 may be adjusted differently within an irradiation area L by lightening respective light sources 11 of the right lighting unit 10b.

The sensor unit 20 may divide the detection area D into a plurality of sub-areas, and may identify an object entering each sub-area. Here, the detection area D of the sensor unit 20 may be divided into a first area D1 including the left irradiation area L1, a second area D2 including the right irradiation area L2, and a third area D3 including a space between the first area D1 and the second area D2. That is, the first area D1 and the left irradiation area L1 are in the same range, the second area D2 and the right irradiation area L2 are in the same range, and the third area D3 is an area between the first area D1 and the second area D2.

Furthermore, the detection area D of the sensor unit 20 may further include a fourth area D4 in which an approach of an object on the left side of the first area D1 is detected and a fifth area D5 in which an approach of an object on the right side of the second area D2 is detected. The fourth area D4 and the fifth area D5 are provided for detecting an approach of an object in advance. That is, the fourth area D4 enables fast control of light within the left irradiation area L1 of the first area D1 by detecting an object entering the first area D1 in advance, and the fifth area D5 enables fast control of light within the right irradiation area L2 of the second area D2 by detecting an object entering the second area D2 in advance. This makes it possible to set the priority of an object entering the detection area D more finely, and to control the brightness of light of the lighting unit 10 accordingly.

Concerning the left lighting unit 10a, the right lighting unit 10b, and the detection area of the sensor unit 20 described above, embodiments of the present invention will be described below.

As various exemplary embodiments of the present invention, as may be seen from FIG. 5, when it is identified that two or more objects have entered the first area D1, the control unit 30 may set the object that first entered the first area D1 as a first detection object P1 and then sequentially set the object that subsequently entered the first area D1 as a second detection object P2. Furthermore, the control unit 30 may control the left lighting unit 10a such that brightness control of light is performed following the first detection object P1 in the left irradiation area L1.

Here, it is assumed that the objects have entered the first area D1, but this is only for understanding the present invention, and the same control may be performed when the objects enter the opposite second area D2.

As described above, when two objects enter the first area D1, the control unit 30 determines priorities according to the order of entry into the first area D1. That is, the object that first entered the detection area D may be set as the first detection object P1 with the first priority, and the object that subsequently entered the detection area D may be set as the second detection object P2 with the next priority. In the present manner, detection objects up to an n-th detection object may be sequentially set.

When detection objects P are determined according to priorities as described above, the control unit 30 controls the light of the lighting unit 10 for the first detection object P1 that entered the first area D1. Thus, since the first detection object P1 continuously receives light while moving in the detection area D, the first detection object P1 is clearly recognized.

Thereafter, when it is identified that the first detection object P1 left the first area D1 and has entered the third area D3, the control unit 30 controls each lighting unit 10 such that brightness control of light is performed on the right side of the left irradiation area L1 and on the left side of the right irradiation area L2.

Figure 6:
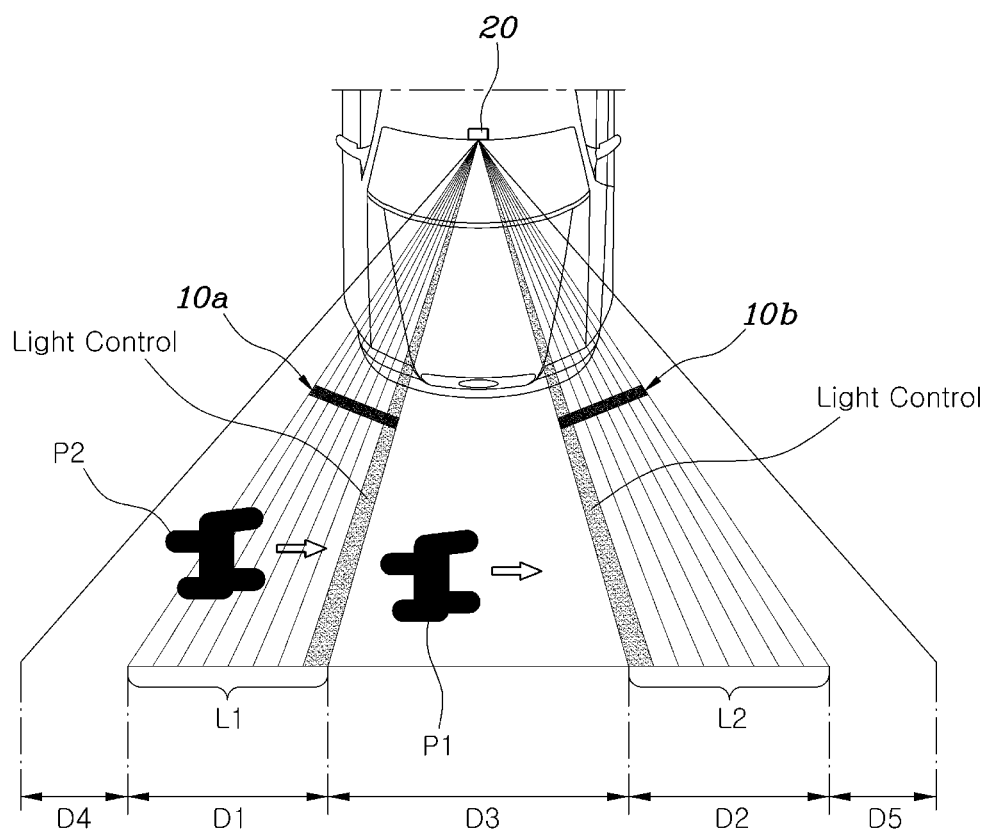

That is, as illustrated in FIG. 6, when the first detection object P1 left the first area D1 or the second area D2 including the irradiation area of the lighting unit and has entered the third area D3, the control unit 30 controls the left lighting unit 10a and the right lighting unit 10b such that brightness control of light is performed on the right side of the left irradiation area L1 and the left side of the right irradiation area L2, indicating that the first detection object P1 is located in the third area D3.

That is, even if the detection object P left the irradiation area, communication with the detection object P is maintained by indicating that the detection object P is located between the left irradiation area L1 and the right irradiation area L2.

Meanwhile, the control unit 30 prevents brightness control of light from being performed for other detection objects that have entered the detection area D in the state in which the first detection object P1 is located within the detection area D, preventing inconvenience from being caused due to the lighting of a plurality of light sources 11. Furthermore, since communication between the vehicle and the object is possible even if brightness control of light is performed for the first detection object P1, the brightness control of light is performed for the first detection object P1.

In the present way, if it is identified that the first detection object P1 continuously moves, leaves the third area D3, and enters the second area D2, as shown in FIG. 7, the control unit 30 controls the right lighting unit 10b such that brightness control of light is performed following the movement of the first detection object P1. Due to the given configuration, when the first detection object P1 moves and enters the second area D2, light is naturally moved following the movement of the first detection object P1, and thus the first detection object P1 is clearly recognized.

Meanwhile, as illustrated in FIG. 8, when the third detection object P3 enters the detection area D after the first detection object P1 has left the second area D2, the control unit 30 performs brightness control of light on the third detection object P3.

That is, when the first detection object P1 passed through the first area D1 and the third area D3 and passed through the second area D2, it means that the first detection object P1 left the vicinity of the vehicle. Thus, the brightness control of light for the primary detection target P1 is terminated. Here, when the third detection object P3 has entered the detection area D after the first detection object P1 left the vicinity of the vehicle, there may be a lack of recognition between the vehicle and the third detection object P3. Thus, the control unit 30 may perform brightness control of light on the third detection object P3 such that the third detection object P3 is clearly recognized.

As described above, in various exemplary embodiments of the present invention, by performing brightness control of light on the detection object P that has entered the first detection area D, it is possible to perform communication in which information is provided such that the vehicle is configured to recognize the object and the object also identifies that the vehicle recognizes the object. Furthermore, by performing brightness control of light on an additional detection object P which has entered the detection area D after a detection object which first entered the detection area D left the vicinity of the vehicle, recognition is maintained on the additional detection object P and thus stability is ensured for all detection objects P.

Meanwhile, as another exemplary embodiment of the present invention, when a first detection object P1 leaves the second area D2, the control unit 30 may perform brightness control of light on a second detection object P2 which enters the detection area D after the first detection object P1.

When the above-described first detection object P1 passes through the first area D1 and the third area D3 and then passes through the second area D2, leaving the vicinity of the vehicle, the controller 30 may perform brightness control of light on the second detection object P2 which enters the detection area D subsequent to the first detection object P1.

In the present way, when sequentially controlling light according to the priority of the detection object P entering the detection area D, it may be identified that the vehicle continuously recognizes the object.

The sequential brightness control of light may be selectively performed according to the distance between the first detection object P1 and the second detection object P2 or the positions of the first detection object P1 and the second detection object P2 in respective areas.

As illustrated in FIG. 9, when the first detection object P1 left the first area D1 and the second detection object P2 is located in the first area D1, the control unit 30 may control the left lighting unit 10a such that brightness control of light is further performed according to the movement of the second detection object P2.

That is, when the first detection object P1 is located in the first area D1, since the brightness control of light is performed on the first detection object P1, control of light is not performed on the second detection object P2. When the first detection object P1 left the first area D1 and the second detection object P2 is located in the first area D1, the control unit 30 controls the left lighting unit 10a such that brightness control of light is performed following the movement of the second detection object P2. Accordingly, it is possible to externally indicate that the vehicle recognizes the second detection object P2.

Here, as illustrated in FIG. 10, when the second detection object P2 is located in the third area D3, the control unit 30 may control respective lighting units 10 such that brightness control of light is further performed on the right side of the left illumination area L1 and the left side of the right illumination area L2.

That is, when the first detection object P1 is located in the third area D3, brightness control of light is performed on the right side of the left illumination area L1 and the left side of the right illumination area L2 so that recognition of the first detection object P1 may be maintained. Thereafter, when the first detection object P1 moves to the second area D2, the right lighting unit 10b allows light control to be performed following the first detection object P1. Furthermore, when the second detection object P2 enters the third area D3, brightness control of light is performed on the right side of the left irradiation area L1 and the left side of the right irradiation area L2 so that recognition of the second detection object P2 is maintained.

Due to the given configuration, even if the second detection object P2 leaves the first area D1 or the second area D2 and is located in the third area D3, recognition of the second detection object P2 is maintained so that pedestrians can feel a sense of stability.

Hereinafter, the situation in which objects move in opposite directions around the vehicle will be described.

When the controller identifies that objects have entered the first area D1 and the second area D2, respectively, the control unit 30 may set the object that has first entered the first area D1 and the second area D2 as a first detection object P1, may set the object that has subsequently entered the first area D1 and the second area D2 as a second detection object P2, and may perform brightness control of light on the first detection object P1.

To help understanding of the present invention, descriptions are made with reference to the drawings illustrating that an object first enters the second area D2 and another object enters the first area D1.

That is, as illustrated in FIG. 11, the control unit 30 sets the object that first entered the second area D2 as a first detection object P1, and sets the object that subsequently entered the first area D1 as a second detection object P2. Here, light is projected to the first detection object P1 with different brightness via the right lighting unit 10b such that the control of light via the lighting unit 10 is performed on the first detection object P1. In the instant case, the brightness control of light increases the brightness of light with respect to the first detection object P1, so that a pedestrian is clearly recognized and communication becomes clear.

Furthermore, the lighting unit 10 performs lighting of each light source 11 following the movement path of the first detection object P1, whereby the first detection object P1 is clearly recognized by continuously receiving light while moving in the detection area D.

Furthermore, the control unit 30 controls the brightness of light for the remaining detection objects other than the first detection object P1 and additional detection objects, whereby the remaining detection objects including the second detection object P2 are clearly recognized.

That is, referring to FIG. 12, when the first detection object P1 is located in the third area D3 and the second detection object P2 is located in the first area D1, the left lighting unit 10a controls light following the movement of the second detection object P2, and at the same time, also controls light on the right side of the left irradiation area L1, and the right lighting unit 10b controls light on the left side of the right irradiation area L2. As described above, since light control is performed on both the first detection object P1 and the second detection object P2, it is possible to externally indicate that the vehicle recognizes the objects, and the objects are also able to recognize it.

As another exemplary embodiment of the present invention, the control unit 30 may set a priority for each of objects entering the first area D1, the second area D2, and the third area D3, respectively, may select the first detection object P1 in each area, and may perform brightness control of light for each first detection object P1 by controlling the lighting unit 10.

By setting a priority for each area and selecting the first detection object P1 in each area as described above, brightness control of light may be performed differently for each area.

That is, even if an object enters each of the first area D1 and the second area D2, a pedestrian entering the first area D1 is set as a first detection object P1 in the first area D1, and a pedestrian entering the second area D2 is set as the first detection object P1 in the second area D2. Accordingly, in the left irradiation area L1 included in the first area D1, light control is performed on the first detection object P1 in the first area D1, and in the right irradiation area L2 included in the second area D2, light control is performed on the first detection object P1 in the second area D2. Furthermore, when two or more objects enter the first area D1, the detection object is set based on the priority in the corresponding area. Thus, sequential light control of the lighting unit 10 may be performed.

As another exemplary embodiment of the present invention, the control unit 30 may prevent brightness control of light from being performed on other detection objects entering the detection area D in the state in which the first detection object P1 is located within the detection area D.

That is, by performing brightness control of light only for the first detection object P1, it is possible to prevent inconvenience caused to objects moving in the vicinity of the vehicle by the light generated by controlling the plurality of light sources 11. Furthermore, since communication between an object and a pedestrian is possible even if brightness control of light is performed only for the first detection object P1, the brightness control of light is performed for the first detection object P1.

As another exemplary embodiment of the present invention, when a specific detection object enters the first area D1 or the second area D2 after the first detection object P1 leaves the first area D1 or the second area D2, the control unit 30 may perform brightness control of light for the specific detection object. That is, when the first detection object P1 leaves the detection area D, the brightness control of light is performed for another detection object to allow the vehicle to clearly recognize that the second detection object P2 is present in the vicinity thereof and to allow the second detection object P2 to identify that the vehicle also recognizes the object.

The vehicle communication lighting system having the structure described above detects a pedestrian around the vehicle and communicates with the pedestrian via lighting which is sequentially lit, ensuring the safety of the vehicle and pedestrian. That is, the vehicle projects light following the movement path of a pedestrian, transmitting a signal that the vehicle has recognized the pedestrian, and the pedestrian is configured to safely move around the vehicle by identifying that the vehicle has recognized the pedestrian.

Furthermore, the term "controller" or "control unit" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A communication lighting system for a vehicle, the communication lighting system comprising:
   a lighting unit including a plurality of light sources disposed in sequence to divide a light irradiation area into a plurality of areas and to project light to each of the plurality of areas with different brightness;
   a sensor configured to detect at least an object in a detection area around the vehicle to detect a position of the object to provide information on the position of the object; and
   a controller electrically-connected to the lighting unit and the sensor and configured to control the lighting unit, to receive the information from the sensor, to set a priority of an object entering the detection area among the at least one object, and to selectively control a brightness of light to be projected to the object with different brightness by selectively controlling each of the plurality of light sources of the lighting unit according to the priority of the object moving in the detection area;
   wherein, when a plurality of objects enter the detection area among the at least one object, the controller sequentially sets each of the plurality of objects as a detection object, and
   wherein the controller is configured to control the lighting unit to perform brightness control of light for a first detection object among the plurality of objects, perform the brightness control of light for a second detection object entering the detection area among the plurality of objects after the first detection object leaves the detection area, and then perform the brightness control of light for a third detection object entering the detection area among the plurality of objects after the second detection object leaves the detection area, whereby the brightness control of light is sequentially performed.

2. The communication lighting system of claim 1, wherein when the controller identifies that an object has entered the detection area among the at least one object, via the sensor, the controller is configured to set the object that has first entered the detection area as a first detection object, and to perform the brightness control of light for the first detection object by controlling the lighting unit.

3. The communication lighting system of claim 2, wherein, when the controller identifies that another object among the at least one object has entered the detection area subsequent to the first detection object, the controller is configured to set the another object as a second detection object, and when the first detection object is located within the detection area, the controller does not perform the brightness control of light for the second detection object, and
   wherein, when the first detection object leaves the detection area in a state in which the first detection object and the second detection object are located in the detection area, the controller is configured to perform the brightness control of light for the second detection object.

4. The communication lighting system of claim 3, wherein, when a third detection object enters the detection area after the first detection object leaves the detection area, the controller is configured to perform the brightness control of light for the third detection object.

5. The communication lighting system of claim 1,
   wherein the lighting unit is formed in plural to include lighting units provided to be spaced from each other in a width direction of the vehicle,
   wherein the lighting units include a left lighting unit having a left irradiation area and a right lighting unit having a right irradiation area in the width direction of the vehicle, and
   wherein the sensor is configured to detect a position of the at least an object by dividing the detection area into a plurality of sub-areas that include the left irradiation area and the right irradiation area, respectively.

6. The communication lighting system of claim 5, wherein the detection area of the sensor includes a first area including the left irradiation area, a second area including the right irradiation area, and a third area including a space between the first area and the second area.

7. The communication lighting system of claim 6, wherein, when the controller identifies that at least two objects among the at least one object, have entered the first area, the controller is configured to set, among the at least one object, an object that first entered the first area as a first detection object, to set, among the at least one object, an object that subsequently enters the first area as a second detection object, and to control the left lighting unit such that the brightness control of light is performed following the first detection object in the left irradiation area.

8. The communication lighting system of claim 7, wherein, when the controller identifies that the first detection object leaves the first area and enters the third area, the controller is configured to control each of the lighting units such that the brightness control is performed on a right side of the left irradiation area and on a left side of the right irradiation area, and wherein, when the controller identifies that the first detection object leaves the third area and enters the second area, the controller is configured to control the right lighting unit such that the brightness control is performed following movement of the first detection object.

9. The communication lighting system of claim 8, wherein, when an additional object, among the at least one object, enters the detection area after the first detection object leaves the second area, the controller is configured to perform the brightness control of light for the additional object.

10. The communication lighting system of claim 8, wherein, when the first detection object has left the second area, the controller is configured to perform the brightness control of light for the second detection object that enters the detection area subsequent to the first detection object.

11. The communication lighting system of claim 8, wherein, when the first detection object has left the first area and the second detection object is located in the first area, the controller is configured to control the left lighting unit such that the brightness control is further performed following movement of the second detection object.

12. The communication lighting system of claim 8, wherein, when the second detection object is located in the third area, the controller is configured to control each of the lighting units such that the brightness control is further performed on the right side of the left irradiation area and on the left side of the right irradiation area.

13. The communication lighting system of claim 7, wherein, the controller is configured to prevent the brightness control of light from being performed, among the at least one object, on other detection objects entering the detection area in a state in which the first detection object is located in the detection area.

14. The communication lighting system of claim 6, wherein, when the controller identifies that objects, among the at least one object, have entered the first area and the second area, respectively, the controller is configured to set an object of the objects, which has first entered the first area and the second area as a first detection object, to set an object of the objects, which has subsequently entered the first area and the second area as a second detection object, and to perform the brightness control of light for the first detection object.

15. The communication lighting system of claim 14, wherein the controller is configured to perform the brightness control of light for a remaining detection object other than the first detection object and an additional detection object.

16. The communication lighting system of claim 14, wherein the controller is configured to set a priority for each of the objects that entered the first area and the second area, and an object that entered the third area, respectively, to select the first detection object in each area, and to perform the brightness control of light for each first detection object by controlling the lighting units.

17. The communication lighting system of claim 14, wherein the controller is configured to prevent the brightness control of light from being performed on other detection objects entering the detection area in a state in which the first detection object is located in the detection area.

18. The communication lighting system of claim 17, wherein, when a predetermined detection object enters the first area or the second area after the first detection object has left the first area or the second area, the controller is configured to perform the brightness control of light for the predetermined detection object.

19. The communication lighting system of claim 6, wherein the detection area of the sensor further includes a fourth area in which an approach of an object, among the at least one object, on the left side of the first area is detected and a fifth area in which an approach of an object, among the at least one object, on the right side of the second area is detected.

* * * * *